United States Patent
Park et al.

[11] Patent Number: 5,176,317
[45] Date of Patent: Jan. 5, 1993

[54] THERMALLY RESPONSIVE VALVE

[75] Inventors: Tae K. Park, Ulsan; Uk S. Shin, Ansan, both of Rep. of Korea

[73] Assignees: Hyundai Motor Co., Seoul; Konghwa Metal Industrial Co., Ltd., Kyunggi-Do, both of Rep. of Korea

[21] Appl. No.: 720,661

[22] Filed: Jun. 25, 1991

[30] Foreign Application Priority Data

Jan. 27, 1989 [KR] Rep. of Korea .................. 89-797

[51] Int. Cl.⁵ ............................................. G05D 23/12
[52] U.S. Cl. ....................................... 236/86; 236/100
[58] Field of Search ............ 236/100, 86, 93 A, 99 K

[56] References Cited

U.S. PATENT DOCUMENTS

| | | | |
|---|---|---|---|
| 2,754,062 | 7/1956 | Von Wangenheim | 236/100 X |
| 2,843,151 | 7/1958 | Greenwalt | 236/100 X |
| 2,873,633 | 2/1959 | May | 236/100 X |
| 3,841,551 | 10/1974 | Ota | 236/86 |
| 3,960,321 | 6/1976 | Steele, Jr. | 236/100 |
| 4,000,849 | 1/1977 | Wagner et al. | 236/100 |
| 4,036,433 | 7/1977 | Wagner et al. | 236/100 |
| 4,128,203 | 12/1978 | Maltby | 236/100 |
| 4,133,349 | 1/1979 | Stripling | 137/882 |
| 4,165,035 | 8/1979 | Maltby | 236/86 |
| 4,185,663 | 1/1980 | Spripling | 137/882 |
| 4,239,152 | 12/1980 | Kitamura et al. | 236/48 |
| 4,285,467 | 8/1981 | Maltby | 236/86 |
| 4,335,690 | 6/1982 | Ho | 123/407 |
| 4,375,873 | 3/1983 | Enomoto et al. | 236/86 |
| 4,386,732 | 6/1983 | Satomoto | 236/48 |

Primary Examiner—William E. Tapolcai

[57] ABSTRACT

A thermally responsive valve for detecting the temperature of an engine of motor vehicles includes: an upper housing having an inlet port, and outlet port, and a cylindrical chamber; a lower housing including thermal expansion member in a thermal transmitting cover; and a movable shaft piston movably disposed within an elongated aperture in the lower housing. The movable shaft piston is operatively connected at one end to the cylindrical chamber for operatively closing or opening the inlet port, and at the other end to the thermal expansion member through a diaphragm for moving the movable shaft piston upward or downward responsive to engine temperature.

4 Claims, 2 Drawing Sheets

THERMALLY RESPONSIVE VALVE

BACKGROUND OF THE INVENTION

1. Field of the Invention

The present invention relates to a thermally responsive valve for an engine of a motor vehicle and more particularly, to an improved thermally responsive valve which includes an upper housing having an inlet port, an outlet port, a cylindrical chamber, and a main chamber; a lower housing having a longitudinally elongated aperture, a thermal transmitting cover and a thermal expansion member such as wax; and a movable shaft piston disposed within the main chamber of the upper housing and the longitudinally elongated aperture of the lower housing. The movable shaft piston contacts the thermal expansion member at one end and has a compression spring at its other end, whereby upon expansion or shrinkage of the thermal expansion member in response to engine body temperature, the movable shaft piston moves upward or downward and causes the cylindrical chamber to close or reopen by means of the top portion blocking or re-establishing communication between the inlet port and the outlet port of the upper housing.

2. Description of the Prior Art

Various types of thermally responsive valves for detecting the temperature of an engine of motor vehicles are known. Such thermally responsive valves are shown in U.S. Pat. No. 3,841,551 to Ota, U.S. Pat. No. 3,960,321 to Steele, U.S. Pat. No. 4,000,849 to Steele et al, U.S. Pat. No. 4,036,433 to Wagner et al, U.S. Pat. No. 4,128,203 to Malthy, U.S. Pat. No. 4,133,349 to Stripling, U.S. Pat. No. 4,165,035 to Maltby, U.S. Pat. No. 4,185,663 to Stripling, U.S. Pat. No. 4,239,152 to Kitamura et al, U.S. Pat. No. 4,285,467 to Maltby, U.S. Pat. No. 4,335,690 to Hosokawa et al, U.S. Pat. No. 4,375,873 to Enomoto et al, and U.S. Pat. No. 4,386,732 to Satomoto. However, these thermally responsive valves can be inconvenient or unreliable. Also, most of such thermally responsive valves are bimetallic element assemblies. Such bimetallic element assemblies suffer from a number of disadvantages such as, for example, (a) it is very difficult for the on/off system of such assemblies to actuate suddenly, since after the temperature increases to a predetermined temperature, such assemblies tend to return to the original position, (b) it is difficult for an on/off system of such assemblies to be inefficiently completed, and (c) since the bimetallic element material of such assemblies is not so good for detecting the heat, it has to be replaced after a short time period.

SUMMARY OF THE INVENTION

Accordingly, it is an object of the present invention to provide a thermally responsive valve for an engine of a motor vehicle.

Another object of the present invention is to provide an improved thermally responsive valve which includes: an upper housing having an inlet port, an outlet port, a cylindrical chamber, and a main chamber; a lower housing having a longitudinally elongated aperture, a thermal transmitting cover and a thermal expansion member such as wax; and a movable shaft piston disposed within the main chamber of the upper housing and the longitudinally elongated aperture of the lower housing. The movable shaft piston contacts the thermal expansion member at one end and has a compression spring at its other end, whereby upon expansion or shrinkage of the thermal expansion member in response to engine temperature, the movable shaft piston moves upward or downward and causes the cylindrical chamber to close or reopen by means of the top portion of the movable shaft piston blocking or re-establishing communication between the inlet port and the outlet port of the upper housing.

A further object of the present invention is to provide an improved thermally responsive valve which is simple in construction, compact for portability, inexpensive to manufacture, and has a long time period of operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a thermally responsive valve for detecting the temperature of an engine of motor vehicles, which comprises an upper housing having an inlet port, an outlet port, and a cylindrical chamber; a lower housing with thermal expansion member in a thermal transmitting cover; and a movable shaft piston movably disposed within an elongated aperture in the lower housing. One end of the movable shaft piston is operatively connected to the cylindrical chamber for closing or opening the inlet port and the other end of the movable shaft piston is connected to the thermal expansion member through a diaphragm on top of the thermal expansion member for moving the movable shaft piston upward or downward.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
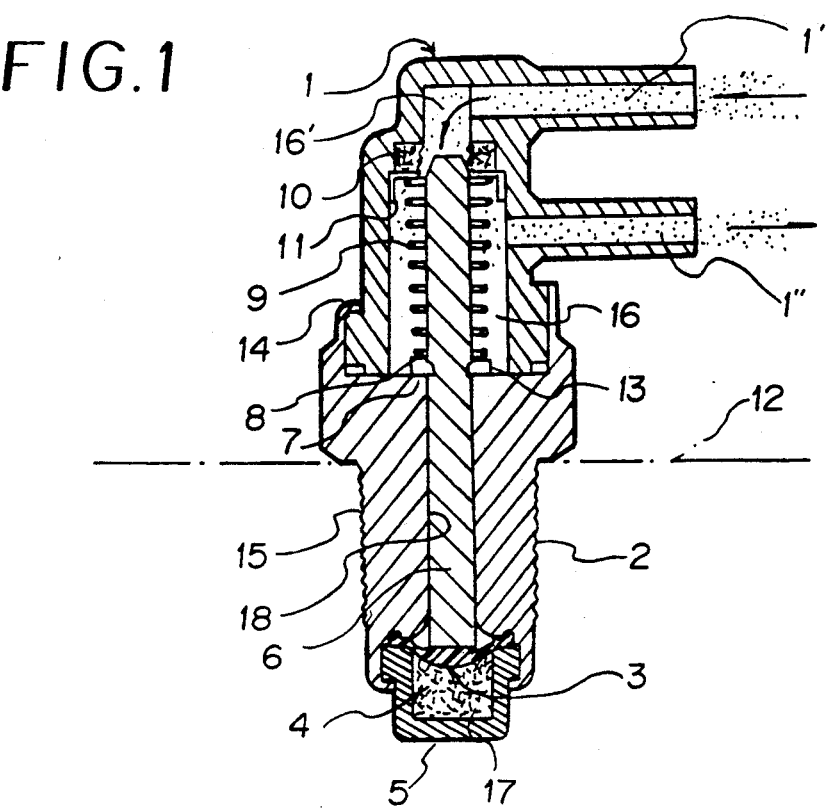
FIG. 1 is a longitudinal sectional view of the thermally responsive valve according to the present invention showing in a normal state position.
Figure 2:
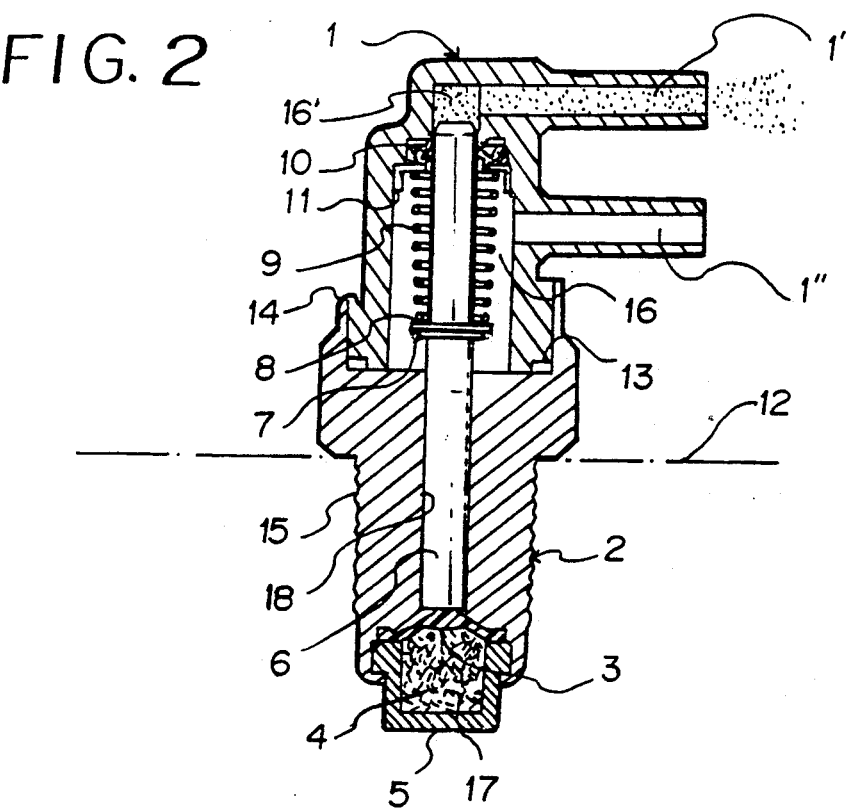
FIG. 2 is a longitudinal sectional view of the thermally responsive valve according to the present invention showing in a operation state position.

Referring now in detail to the drawings for the purpose of illustrating preferred embodiments of the present invention, the thermally responsive valve for detecting the temperature of an engine of a motor vehicle as shown in FIGS. 1 and 2 comprises an upper housing 1 and a lower housing 2 connected to the upper housing 1 in an airtight fashion. The airtight connection is ensured by a O-ring 13 provided between the upper and lower housings 1 and 2. Preferably, one end of the upper housing 1 is fitted into an opening 14 of the lower housing 2 and then the opening 14 is crimped around the upper housing 1. The other end of the lower housing 2 is connected to thermal transmitting cover 5 also in an airtight fashion. The upper housing 1 together with the lower housing 2 having the thermal transmitting cover 5 form a housing assembly which can be attached to an engine body 12 (not shown) by means of a threaded portion 15 formed on the periphery of the lower housing 2. Therefore, the housing assembly can come in contact with a thermal medium such as an engine coolant.

The upper housing 1 includes an inlet port 1', an outlet port 1", and a cylindrical chamber 16' connecting the inlet port 1' to a main chamber 16. A diaphragm 3 is disposed between the lower housing 2 and the thermal transmitting cover 5 so as to enclose a hollow portion 17 formed in the cover 5. The hollow portion 17 of the cover 5 contains a thermal expansion member 3 such as, for example, wax. A movable shaft piston 6 is movably located within a longitudinally elongated aperture 18 vertically disposed in the center of the lower housing 2 and the main chamber 16 of the upper housing 1. A compression spring 9 is wound around the upper portion of the movable shaft piston 6. The compression spring is retained in place at one end by a washer 8 and a stopping ring 7, and at the other end by a support ring 11 and a valve seat packing 10.

The thermally responsive valve of the present invention operates as follows.

Normally, the movable shaft piston 6 is held down by the force of compression spring 9 so that communication between the inlet port 1' and the outlet port 1" is established by means of the cylindrical chamber 16' and the main chamber 16. Therefore, fluid which enters the inlet port 1' exits through the outlet port 1" as shown in FIG. 1.

When the temperature of the engine body 12 increases, the temperature of the engine coolant increases, and the thermal transmitting cover 5 transmits heat to the thermal expansion member 4 and causes the thermal expansion member 4 to expand suddenly. Therefore, the movable shaft piston 6 moves upward against the compression spring 9 due to the upward movement of the diaphragm 3 as shown in FIG. 2.

At this time, the movable shaft piston 6 comes into contact with the inner periphery of the valve seat packing 10 of the upper housing 1. Further expansion of the thermal expansion member 4 causes the movable shaft piston 6 to move upward along the longitudinally elongated aperture 18 of the lower housing 2 so as to keep a close contact with the inner periphery of the cylindrical chamber 16'. Therefore, the communication of the inlet port 1' and the outlet port 1" is broken so that fluid which enters inlet port 1' cannot flow to the outlet port 1" (FIG. 2).

When the temperature of the engine body 12 decreases, the thermal expansion member 4 shrinks. Therefore, the movable shaft piston 6 will return to its initial position due to the force of the compression spring 9 (FIG. 1).

It should be noted that since the movable shaft piston 6 is movably fitted within the longitudinally elongated aperture 18 of the lower housing 2, the movable shaft piston 6 can move within the cylindrical chamber 16' without tilting so that the O-ring 13 ensures a reliable seal effect will not suffer uneven wear.

Figure 3:
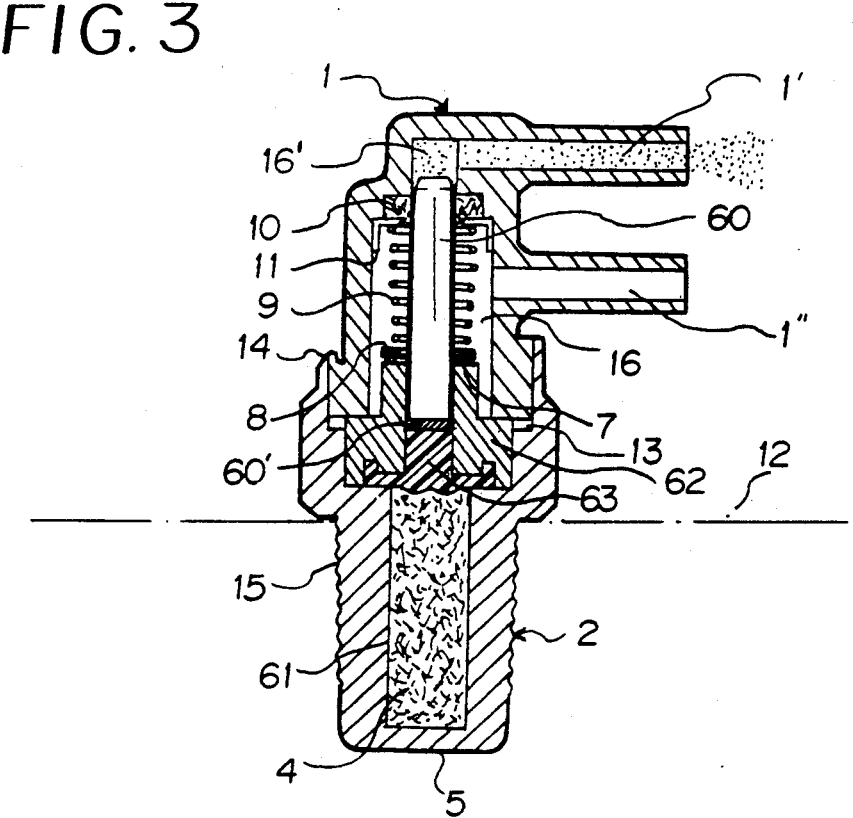
FIG. 3 is a longitudinal sectional view of another embodiment of the thermally responsive valve according to the present invention in a normal state position.

FIG. 3 is a longitudinal sectional view illustrating another embodiment of the thermally responsive valve according to the present invention. This additional embodiment of the present invention comprises a vertically elongated diaphragm 63, a movable short shaft piston 60 having a protective sheet 60' disposed at the lower end thereof for preventing the fluid such as gasoline from contaminating the thermal expansion member 4 stored in an vertically elongated hollow portion 61 and running the vertically elongated diaphragm 63. Because the protective sheet 60' preferably has a larger diameter that the diameter of the movable short shaft piston 60 and the movable shaft piston 60 having the protective sheet 60 can slightly move upward and downward through a vertically elongated guide member 62 disposed in the middle portion of the thermally responsive valve. The protective sheet 60' is preferably made of TEFLON (polytetrafluoroethylene).

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A thermally responsive valve for detecting the temperature of an engine of a motor vehicle which comprises:

an upper housing, said upper housing including:
  an inlet port disposed at one side thereof,
  an outlet port disposed parallel with said inlet,
  a cylindrical chamber communicating with said inlet port,
  and a main chamber communicating with said cylindrical chamber and said outlet port;
a lower housing fixedly connected to said upper housing in an airtight fashion, said lower housing including:
  a thermal transmitting cover disposed at one end portion of said lower housing,
  a hollow portion between said end portion and said thermal transmitting cover for containing a thermal expansion member,
  a guide member positioned in said lower housing, said guide member being generally fixed with respect to the thermal transmitting cover and having a longitudinally elongated aperture defined therein, the aperture being disposed generally in a center of the lower housing;
  a one-piece diaphragm disposed on said thermal expansion member, the one-piece diaphragm having a T-shape with a top part and a stem part, a portion of the top part being engaged with the thermal expansion material, the stem part being disposed in the elongated aperture of the guide member,
  a movable shaft piston movably disposed within said longitudinally elongated aperture, said movable shaft piston being provided with a compression spring wound along a top portion of said movable shaft piston, said compression spring being retained by a washer and a stopping ring at a bottom end thereof and by a supporting ring and a valve seat packing at a top end thereof and
  a protective sheet attached to a bottom end of said movable shaft piston for preventing gasoline from contaminating the thermal expansion member, said protective sheet being made of "TEFLON" and having a larger diameter than the diameter of said movable shaft piston, the protective sheet being disposed int eh elongated aperture between the stem part of the diaphragm and an end of the shaft piston whereby upon a temperature increase of said engine, said thermal transmitting cover transmits heat to said thermal expansion member, said thermal expansion member suddenly expands and the diaphragm suddenly moves upward and then the movable shaft piston moves upward against the compression spring so as to establish close contact with an inner periphery of the cylindrical chamber so that communication between the inlet port and the outlet port is broken, and upon decreasing the temperature of the engine, the movable shaft piston is returned to an original position and communication between the inlet port and the outlet port is established.

2. The thermally responsive valve of claim 1, wherein the thermal expansion member is wax.

3. The thermally responsive valve of claim 1, wherein the movable shaft piston having the protective sheet is provided with a vertically elongated guide member for slightly moving upward and downward therethrough.

4. The thermally responsive valve of claim 1, wherein the diaphragm has a vertically elongated configuration.

* * * * *